(12) United States Patent
Sawada

(10) Patent No.: US 8,602,852 B2
(45) Date of Patent: Dec. 10, 2013

(54) AIR BLOWING DEVICE

(75) Inventor: Koji Sawada, Toyota (JP)

(73) Assignee: Howa Plastics Co., Ltd., Toyota-Shi (JP)

( * ) Notice: Subject to any disclaimer, the term of this patent is extended or adjusted under 35 U.S.C. 154(b) by 845 days.

(21) Appl. No.: 12/677,657

(22) PCT Filed: Dec. 5, 2008

(86) PCT No.: PCT/JP2008/072601
§ 371 (c)(1),
(2), (4) Date: Mar. 11, 2010

(87) PCT Pub. No.: WO2010/050077
PCT Pub. Date: May 6, 2010

(65) Prior Publication Data
US 2011/0217915 A1    Sep. 8, 2011

(30) Foreign Application Priority Data

Oct. 30, 2008   (JP) ................ 2008-279754

(51) Int. Cl.
*B60H 1/34*   (2006.01)
(52) U.S. Cl.
USPC ............ 454/154; 454/143; 454/152; 454/153
(58) Field of Classification Search
USPC .................. 454/143, 145, 152–155
See application file for complete search history.

(56) References Cited

U.S. PATENT DOCUMENTS

| | | | | |
|---|---|---|---|---|
| 3,802,328 A | * | 4/1974 | Kakizaki | 454/154 |
| 3,835,759 A | * | 9/1974 | Lloyd | 454/154 |
| 6,059,652 A | * | 5/2000 | Terry et al. | 454/155 |
| 7,306,512 B2 | * | 12/2007 | Sawai | 454/155 |
| 7,527,553 B2 | * | 5/2009 | Steinbeiss | 454/155 |
| 7,566,261 B2 | * | 7/2009 | Ono et al. | 454/155 |
| 2007/0066206 A1 | * | 3/2007 | Ono et al. | 454/69 |
| 2011/0092149 A1 | * | 4/2011 | Spamer et al. | 454/155 |
| 2011/0217915 A1 | * | 9/2011 | Sawada | 454/162 |
| 2012/0122387 A1 | * | 5/2012 | Nicola et al. | 454/155 |

FOREIGN PATENT DOCUMENTS

| | | | |
|---|---|---|---|
| EP | 1 279 532 A2 | 1/2003 | |
| EP | 1 749 682 A1 | 2/2007 | |
| FR | 2 880 587 A1 | 7/2006 | |
| JP | 59-011914 A1 | 1/1984 | |
| JP | 2003-011658 A1 | 1/2003 | |
| JP | 2004-237854 A1 | 8/2004 | |
| JP | 2004249912 A * | 9/2004 | B60H 1/34 |
| JP | 2006-306125 A1 | 11/2006 | |

(Continued)

OTHER PUBLICATIONS

U.S. Appl. No. 12/677,641, filed Mar. 11, 2010, Hibino et al.

*Primary Examiner* — Steven B McAllister
*Assistant Examiner* — Jamil Decker
(74) *Attorney, Agent, or Firm* — Burr & Brown

(57) ABSTRACT

An operation load application member includes: a pivot support portion, a leg portion having a first projection and a second projection at its tip; and a connection portion which connects the pivot support portion and the leg portion together. The pivot support portion, the leg portion, and the connection portion are unitarily formed. The operation load application member can generate, by itself, a plurality of operation loads and a plurality of operation feels. Accordingly, there is provided an air blowing device which can reduce manufacturing cost while maintaining satisfactory operation loads and operation feels.

5 Claims, 6 Drawing Sheets

(56) References Cited

FOREIGN PATENT DOCUMENTS

| JP | 2006-306125 | A1 | | 11/2006 |
|----|----|----|----|----|
| JP | 2007-153207 | A1 | | 6/2007 |
| JP | 2010179879 | A | * | 8/2010 |
| JP | 2010201953 | A | * | 9/2010 |

* cited by examiner

FIG.4
(a)
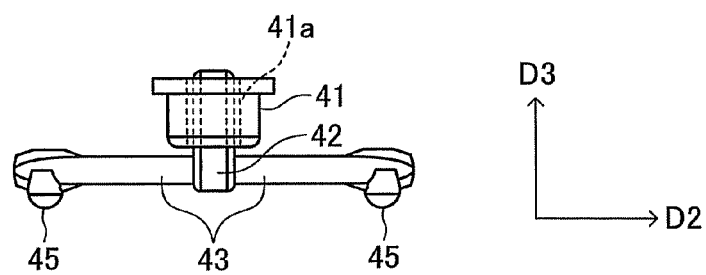
(b)
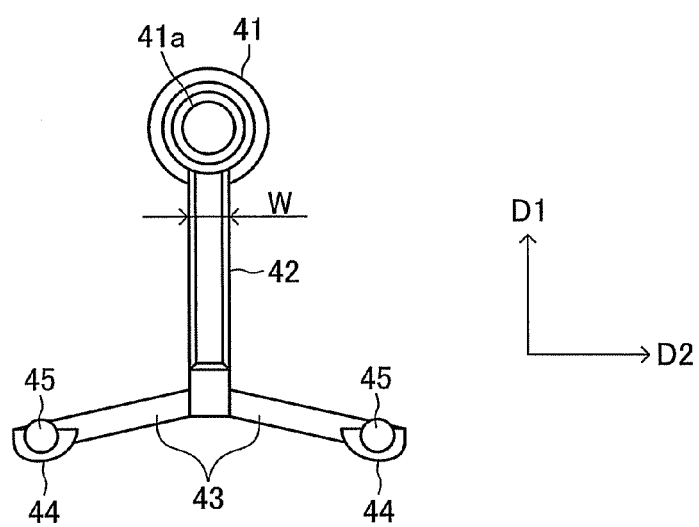
(c)
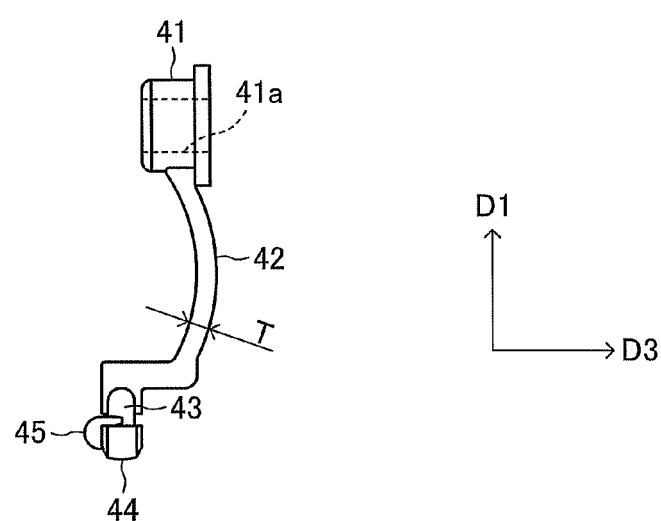

AIR BLOWING DEVICE

BACKGROUND OF THE INVENTION

1. Field of the Invention

The present invention relates to an air blowing device for use in an air conditioner of an automobile or the like.

2. Description of Related Art

Conventionally, there is proposed an air blowing device for switching between supply and shutoff of cooled or heated air or the like to the interior of an automobile or the like and for adjusting the direction of an airflow in the case of supply of cooled or heated air or the like, for the purpose of adjusting the interior atmosphere of the automobile or the like.

One conventional air blowing device includes a plurality of airflow direction adjustment plates, an annular member, and a tubular body. The plurality of airflow direction adjustment plates are connected to one another by connection members, and pivotally move in an interlocking relation. Further, the plurality of airflow direction adjustment plates are supported in the annular member so as to be pivotally movable about a pivotal axis perpendicular to the axis (center axis) of the annular member. Still further, the annular member, which supports the plurality of airflow direction adjustment plates as described above, is supported in the tubular body so as to be coaxially rotatable with respect to the tubular body about the axis of the tubular body. Namely, the air blowing device is designed so as to adjust both the rotational angle of the airflow direction adjustment plates about the axis of the air blowing device and the pivotal axis thereof perpendicular to the axis of the air blowing device. Accordingly, the air blowing device enables an control of the blowing direction of airflow (refer to, for example, Japanese Patent Application Laid-Open No. 2004-237854).

DISCLOSURE OF THE INVENTION

In the above-mentioned conventional air blowing device, the plurality of airflow direction adjustment plates have cylindrical pivot portions. Meanwhile, the annular member has holes for bearings. Sliding members formed of an elastic material such as rubber are fitted into the holes for bearings. The sliding members have bearing holes. The pivot portions of the plurality of airflow direction adjustment plates are press-fitted into the "bearing holes formed in the sliding members disposed within the holes for bearings of the annular member." The sliding members induce a frictional resistance force to the pivot portions in a direction opposite the rotational direction of the pivot portions. Accordingly, there can be provided an operation load (hereinafter may be referred to as a "pivotal operation load") when the airflow direction adjustment plates are pivotally moved about the pivotal axis perpendicular to the axis of the air blowing device.

Further, the above-described annular member has a plurality of arm portions which extend from the inner surface toward the axis (center axis) of the annular member, and a center bearing portion which is held by the plurality of arm portions at a predetermined part on the axis. Meanwhile, the above-mentioned tubular body has a mesh portion provided to cover a rear-end opening portion (an air inflow portion) of the tubular body, and a center shaft member held by the mesh portion to be positioned at a predetermined position on the axis of the tubular body. This center shaft member is rotatably supported by the center bearing portion when the annular member is supported in the tubular body.

This center shaft member suppresses inclination of the rotation axis of the annular member with respect to the rotation axis of the tubular body and eccentricity between the annular member and the tubular member. As a result, this structure suppresses generation of noise generated due to hitting of the annular member against the tubular body (hereinafter, such noise will be referred to as "hitting noise"), and prevents rotation of the annular member from being difficult or impossible due to excessive contract between the annular member and the tubular body (hereinafter, states where rotation of the annular member is difficult or impossible will be collectively referred to as the "rotation anomalous state").

Moreover, the above-described annular member is provided with an operation load application member having leg portions having a predetermined shape. Meanwhile, the above-described tubular body has an annular projection portion composed of a plurality of projections provided along the inner surface of the tubular body. When the annular member is supported in the tubular body, the tip portions of the leg portions of the operation load application member are pressed against the annular projection portion. By this configuration, when the annular member is rotated about the axis of the tubular body, the tip portions of the leg portions move over the projections one after another while being in contact with the annular projection portion. As a result, there can be obtained an operation load which is induced when the airflow direction adjustment plates are rotated about the axis of the air blowing device (hereinafter may be referred to as "rotational operation load") and operation feel to be provided at that time (hereinafter may be referred to as "rotational operation feel").

As described above, in the above-mentioned conventional air blowing device, members for producing the pivotal operation load, members for suppressing generation of hitting noise and occurrence of the rotation anomalous state, and members for producing the rotational operation load and the rotational operation feel, are provided separately. Since these members are manufactured independently one another, the number of steps required for manufacturing the air blowing device is large. Further, since the conventional air blowing device is manufactured through sequential assembly of the manufactured members, the assembly work is complicated and time-consuming. Moreover, in the case of the above-described annular member, the plurality of arm portions and the center bearing portion are provided to cover the opening portion of the annular member. Therefore, the plurality of arm portions and the center bearing portion hinder an "operation of assembling the airflow direction adjustment plates and other necessary members to the annular member." Therefore, the air blowing device involves a problem of high cost of manufacture.

The present invention has been achieved to solve the above-mentioned problems. Specifically, an object of the invention is to provide an air blowing device which can induce a pivotal operation load, a rotational operation load, and a rotational operation feel, which can suppress generation of hitting noise and occurrence of a rotation anomalous state, and which can be manufactured at low cost by facilitating the manufacture and reducing the man-hours of the manufacture and the man-hours of the assembly.

More specifically, an air blowing device according to the present invention comprises:

a tubular body configured to form an air outflow channel, the tubular body having a rear-end opening portion allowing an air to flow into the tubular body and a front-end open portion allowing the air to blow out from the tubular body;

an annular member supported in the tubular body so as to be coaxially rotatable with respect to the tubular body about an axis of the tubular body; and at least one airflow direction adjustment plate supported in the annular member, by a pair of pivot portions, so as to be un-rotatable with respect to the annular member about an axis of the annular member and be pivotally movable with respect to the annular member about a common pivotal axis or each pivotal axis perpendicular to the axis of the annular member, the pair of pivot portions projecting outwardly to be aligned with the common pivotal axis or the each pivotal axis, the at least one airflow direction adjustment plate being configured to adjust a direction of the air blown out from the tubular body.

The air blowing device of the present invention further comprises an operation load application member adjusting: a rotational operation load induced upon the annular member being rotated with respect to the tubular body; and a pivotal operation load induced upon the at least one airflow direction adjustment plate being pivotally moved with respect to the annular member.

In the air blowing device of the present invention, the tubular body includes an annular projection portion having a plurality of projections annularly arranged along inner surface of the tubular body. The plurality of projections may project toward a direction along the axial direction of the annular body or toward the radially inward direction of the tubular body.

The at least one airflow direction adjustment plate is configured to pivotally move in an interlocking relation in a movable range from a first position at which the front-end opening portion of the tubular body is closed by one plate or a plurality of plates including the at least one airflow direction adjustment plate (see FIG. 5) to a second position at which the front-end opening portion of the tubular body is not closed (see FIG. 6).

The operation load application member includes: a pivot support portion; a leg portion; and a connection portion connecting the pivot support portion and the leg portion. The pivot support portion, the leg portion, and the connection portion are integrally formed of same material in an inseparable manner (see FIG. 4).

The pivot support portion has a bearing hole. The pivot support portion is engaged with an inner wall of the annular member, and one of the pivot portions aligned with the common pivotal axis or the each pivotal axis is press-fitted into the bearing hole (see FIG. 7).

The leg portion has, at its tip: a first projection projecting toward a direction along the axial direction of the annular member and engaging with the annular projection portion; and a second projection projecting toward a radially outward direction and pressing an inner wall of the tubular body toward the radially outward direction (see FIGS. 4 and 7).

The connection portion curves to project toward a radially inward direction. And a predetermined part of the at least one airflow direction adjustment plate contacting with a radially inside surface of the connection portion and pressing the radially inside surface toward the radially outward direction only when the at least one airflow direction adjustment plate being positioned within a predetermined range. The predetermined range is near the first position in the movable range and does not include the first position. The predetermined part is locked with the connection portion when the at least one airflow direction adjustment plate is positioned at the first position so as to maintain the at least one airflow direction adjustment plate to be positioned at the first position (see FIG. 1).

The operation load application member used in the air blowing device of the present invention can induce, by itself, all of the above-described "pivotal operation load," "rotational operation load," and "rotational operation feel." Further, this operation load application member can suppress generation of "hitting noise" and occurrence of a "rotation anomalous state" for the following reason.

In the air blowing device of the present invention, the at least one airflow direction adjustment plate is supported in the annular member so as to "be un-rotatable with respect to the annular member about an axis of the annular member and be pivotally movable with respect to the annular member about a common pivotal axis or each pivotal axis perpendicular to the axis of the annular member." Further, each of the at least one airflow direction adjustment plate is supported in the annular member by "a pair of pivot portions projecting outwardly to be aligned with the common pivotal axis or the each pivotal axis." In other words, in the present invention, each airflow direction adjustment plate may have a corresponding "pair of pivot portions." Moreover, in the present invention, a plurality of airflow direction adjustment plates, i.e., all of airflow direction adjustment plates or a part of all of airflow direction adjustment plates, may share a single "pair of pivot portions." Further, the annular member, which includes the airflow direction adjustment plate as described above, is supported so as to "be coaxially rotatable with respect to the tubular body about an axis of the tubular body."

Accordingly, the air blowing device of the present invention is configured to adjust both the rotational angle of the airflow direction adjustment plate about the axis of the air blowing device and the rotational angle of the airflow direction adjustment plate about a predetermined pivotal axis perpendicular to the axis of the air blowing device. In the air blowing device of the present invention, as a member for adjusting the direction of air blown out from the tubular body, there may be employed an "airflow adjustment member formed by integrally forming at least one airflow direction adjustment plate and a predetermined connection member in an inseparable condition." Alternatively, there may be employed an "airflow adjustment member which includes at least one independent airflow direction adjustment plates, and a connection member which connects these airflow direction adjustment plates so as to rotate them in an interlocking relation."

As described above, the operation load application member used in the air blowing device of the present invention includes a pivot support portion, a leg portion, and a connection portion, which are formed unitarily. For example, the operation load application member of the present invention can be formed through molding of a synthetic resin.

The "pivot support portion" has a "bearing hole." One of the pivot portions, via which the at least one airflow direction adjustment plate is supported in the annular member (hereafter may be simply referred to as the "pivot of the airflow direction adjustment plate"), is press-fitted into the bearing hole (see FIG. 7). Accordingly, when the pivot of the airflow direction adjustment plate is rotated, a frictional resistance force is applied from the bearing hole to the pivot in a direction opposite the rotational direction. Since this frictional resistance force prevents unintentional rotation of the pivot of the airflow direction adjustment plate, a state where the airflow direction adjustment plate is rotated about the pivotal axis by a predetermined angle can be maintained. Namely, the pivot support portion induces the above-described "rotational operation load."

Further, the above-mentioned "leg portion" has, at its tip, an "a first projection projecting toward a direction along the axial direction of the annular member" (see FIG. 4). The operation load application member is fixedly engaged (held by and fixed to) with the inner wall of the annular member.

Therefore, when the annular member is supported in the tubular body, the first projection comes into engagement with the annular projection portion of the tubular body (see FIG. 7). At that time, at least the leg portion elastically deforms in accordance with a force which the first projection receives from the annular projection portion. The leg portion elastically deforms in such a manner that the leg portion curves in a direction parallel to the axis of the tubular body and away from the annular projection portion (i.e., in a direction D1 shown in FIGS. 4 and 7). Due to a reaction force induced as a result of this elastic deformation of the leg portion, the first projection is pressed against the annular projection portion (hereinafter, a force in the axial direction of the tubular body which is generated as a result of elastic deformation of the leg portion will be referred to as an "axial elastic force"). Accordingly, when the annular member is rotated about the axis of the tubular body, the first projection moves over projections of the annular projection portion one after another while being in contact with the annular projection portion.

When the first projection moves over one projection of the annular projection portion, the one projection applies a resistance force to the first projection in a direction opposite to the moving direction. Further, every time the first projection moves over one projection, the first projection is pressed toward a recess between the one projection and another projection adjacent to the one projection due to the axial elastic force of the leg portion. Accordingly, the leg portion and the first projection cooperatively induce the above-described "rotational operation load" and the above-described "rotational operation feel."

In addition, in the present invention, the number of the leg portions of the operation load application member may be determined in consideration of the rotational operation load and the rotational operation feel which the air blowing device is required to induce, the strength of the operation load application member, etc. For example, the operation load application member may have two leg portions.

Moreover, the above-mentioned "leg portion" has, at its tip, "a second projection projecting toward a radially outward direction" (see FIG. 4). When the annular member is supported by the tubular body, the second projection presses the inner wall of the tubular body toward the radially outward direction (see FIG. 7). At that time, at least the leg portion elastically deforms in accordance with a force which the second projection receives from the inner wall of the tubular body. Accordingly, for example, the leg portion elastically deforms in such a manner that the leg portion curves toward the radially inward direction (in a direction D3 shown in FIGS. 4 and 7). Due to a reaction force induced as a result of elastic deformation of the leg portion, the second projection is pressed against the inner wall of the tubular body (hereinafter, a force toward the radially outward direction which is generated as a result of elastic deformation of the leg portion will be referred to as a "radial elastic force." Thus, when the annular member is rotated about the axis of the tubular body, the second projection can move on the inner wall of the tubular body, while maintaining a state in which the second projection is in contact with the inner surface of the tubular body.

Since the operation load application member is held by the annular member, when the second projection is pressed against the inner wall of the tubular body due to the radial elastic force of the leg portion, the annular member receives from the inner surface of the tubular body a reaction force in a direction (the direction D3 shown in FIGS. 4 and 7) opposite to the direction of the radial elastic force. Due to this reaction force, there is provided a state in which a portion of the outer surface of the annular member is in contact with another portion of the inner surface of the tubular body which faces the portion of the inner surface of the tubular body with which the second projection comes into contact.

By virtue of the above-mentioned configuration, even when the clearance between the annular member and the tubular body changes because of temperature change or the like, a state in which the annular member and the tubular body are in contact with each other at least two locations is maintained, because the leg portion elastically deforms in accordance with the change in the clearance. As a result, the rotational axis of the annular member is prevented from inclining with respect to the rotational axis of the tubular body, whereby the air blowing device can be prevented from entering the "rotation anomalous state." Further, even in a situation where vibration or the like is externally applied to the air blowing device, the rotational axis of the annular member and the rotational axis of the tubular body are prevented from moving relatively to each other, whereby the generation of "hitting noise" can be suppressed. In addition, as in the above-described case, it is preferable that the operation load application member has two leg portions.

Further, the above-described operation load application member can generate an operation feel when the front-end opening portion of the tubular body is closed by the airflow direction adjustment plate (operation feel at the time of full closure to be described later) for the following reason.

In the air blowing device of the present invention, when the airflow direction adjustment plate is positioned at the first position, the front-end opening portion of the tubular body is closed by the "one or a plurality of the at least one airflow direction adjustment plate." Hereinafter, the state in which the front-end opening portion of the tubular body is closed may be referred to as the "fully-closed state." On the other hand, when the airflow adjustment plate is positioned at the second position (or a position between the first position and the second position), the front-end opening portion of the tubular body is not closed, and an airflow is blown in a predetermined direction from the opening portion. Hereinafter, the state in which an airflow is blown out from the opening portion of the air blowing device may be referred to as the "opened state".

When the airflow direction adjustment plate rotates within the range from the fully-closed state (the first position) to the opened state (the second position), the "predetermined part" of the at least one airflow direction adjustment plate moves along with the rotation of the at least one airflow direction adjustment plate. Meanwhile, the "connection portion" of the above-described operation load application member has a "curved shape so as to project toward the radially inward direction" (see FIG. 4). When the airflow direction adjustment plate is in the fully-closed state (the first position), the predetermined part is locked to the connection portion of the operation load application member. By virtue of the above-mentioned configuration, an operation feel at the time when the airflow direction adjustment plate is brought into the fully-closed state (the first position) (hereinafter may be referred to as "operation feel at the time of full closure") can be induced.

The above-described "operation feel at the time of full closure" will be described in more detail with reference to FIG. 1. FIG. 1 is a set of schematic views showing a state where the predetermined part is locked to the connection portion of the operation load application member. The schematic views on the upper side of FIG. 1 are schematic views of the operation load application member and the predetermined part as viewed from a direction perpendicular to a moving direction of the predetermined part; and the schematic views on the lower side of FIG. 1 are schematic views of the member and the portion as viewed from a direction parallel to the moving direction of the predetermined part.

First, the part of the airflow direction adjustment plate is assumed to be moved from the second position (an opened state) to the first position (a fully-closed state) by, for example, a finger of an operator. When the position of the airflow direction adjustment plate approaches the vicinity of the first position, as shown in FIG. 1(a), the predetermined part 39 comes into contact with one side surface of the connection portion 42. Subsequently, when the predetermined part 39 is about to cross over the connection portion 42, the predetermined part 39 receives a predetermined reaction force from the connection portion 42 (see FIG. 1(a)). The upper limit of the reaction force is determined based on the shapes of the predetermined part 39 and the connection portion 42, etc. When the force applied to the predetermined part 39 as a result of the operation of pivotally moving the airflow direction adjustment plate exceeds the upper limit of the reaction force, the movement of the airflow direction adjustment plate is resumed. When the movement of the airflow direction adjustment plate is resumed, the movement of the predetermined part 39 is also resumed.

When the position of the airflow direction adjustment plate further moves toward the first position (the fully-closed state), as shown in FIG. 1(b), the predetermined part 39 moves while pressing a radially inside surface of the connection portion 42 toward the radially outward direction (the direction opposite the direction D3 in FIG. 1). At that time, the connection portion 42 elastically deforms toward the radially outward direction. When the position of the airflow direction adjustment plate reaches the first position (the fully-closed state), as shown in FIG. 1(c), the predetermined part 39 crosses over the connection portion 42 to reach a position of the other side surface of the connection portion 42 opposite the one side surface thereof. In general, when the predetermined part 39 once resumes the movement as described above, the predetermined part 39 crosses instantaneously over the connection portion 42 (see FIG. 1(b)), without stopping, until the predetermined part 39 is locked to the connection portion (see FIG. 1(c)). Accordingly, the state shown in FIG. 1(b) is hardly to be maintained continuously.

After the predetermined part 39 crosses over the connection portion 42, the connection portion 42 returns to the shape before the above-described elastic deformation. At that time, since at least a part of the connection portion 42 is existed radially side of a part of the predetermined part 39, the predetermined part 39 is held on the position of the other side surface of the connection portion 42 (see FIG. 1(c)). Thus, the airflow direction adjustment plate is maintained in the fully-closed state (the first position).

As described above, the predetermined part is locked to the connection portion. The range of the position of the airflow direction adjustment plate in which the predetermined part is present on the radially inside surface of the connection portion (see FIG. 1(b)) corresponds to the above-described "predetermined range being near the first position in the movable range and not including the first position."

When the predetermined part 39 is about to cross over the connection portion 42, the connection portion 42 applies a resistance force to the predetermined part 39 in a direction opposite to the moving direction thereof. When the predetermined part 39 once crosses over the connection portion 42, the predetermined part 39 is held at a predetermined position by the connection portion 42. Accordingly, the connection portion 42 induces an operation feel at the time when the airflow direction adjustment plate is brought into the fully-closed state (the first position) (hereinafter may be referred to as "operation feel at the time of full closure").

As described above, the operation load application member used in the air blowing device of the present invention can induce, by itself, all of the operation load at the time when the airflow direction adjustment plate is pivotally moved about the pivotal axis perpendicular to the axis of the air blowing device (pivotal operation load), the operation load at the time when the airflow direction adjustment plate is rotated about the axis of the air blowing device (rotational operation load), and the operation feel at that time (rotational operation feel). Further, the operation load application member can induce the operation feel at the time when the airflow direction adjustment plate is pivotally moved to the first position (operation feel at the time of full closure). Additionally, this operation load application member can suppress the generation of noise (hitting noise) due to hitting between the annular member and the tubular body, and preventing the rotation of the annular member from being difficult or impossible (rotation anomalous state).

Accordingly, it is unnecessary to manufacture a plurality of members for inducing the above-described operation loads and operation feels, as well as a plurality of members for suppressing the generation of the hitting noise and the occurrence of the rotation anomalous state. Therefore, the number of steps necessary for manufacturing the air blowing device can be reduced. Additionally, the work for assembling these members can be omitted. Further, the air blowing device of the present invention is assembled such that the operation load application member whose shape is maintained through unitary formation is held by the annular member. Accordingly, the operation load application member and the annular member can be assembled simply. Additionally, the annular member used in the air blowing device of the present invention is not required to have arm portions, a center bearing portion, etc. which are provided in the above-described conventional air blowing device. Therefore, the operation load application member and the annular member can be assembled more simply. As a result, the number of steps required for manufacturing the air blowing device and the man-hours required for assembling the air blowing device can be reduced, whereby the manufacturing cost of the air blowing device can be reduced.

In the air blowing device of the present invention, it is preferable that:

the connection portion has a longitudinal direction extending along the axial direction of the annular member, and the predetermined part of the at least one airflow direction adjustment plate moves with respect to the connection portion in a direction approximately perpendicular to the longitudinal direction when the at least one airflow direction adjustment plate moves within the predetermined range; and the connection portion has: a "predetermined width W" as measured in a direction perpendicular to the longitudinal direction; and a "predetermined thickness T" as measured along a radial direction.

In the present invention, when the opening portion of the air blowing device is opened (i.e., the airflow direction adjustment plate is positioned at a position other than the first position), air is blown out to the outside of the air blowing device (hereinafter, a region where air is blown out via the at least one airflow direction adjustment plate may be referred to as an "airflow blow out region"). When the at least one airflow direction adjustment plate rotates from the opened state (the second position) to the fully-closed state (the first position), the area of the airflow blow out region decreases gradually. When the at least one airflow direction adjustment plate is positioned near the fully-closed state, the area of the airflow blow out region becomes considerable small. At that time, the air which passes through the airflow blow out region having a considerable small area forms a turbulent flow, which vibrates the air to thereby generate noise (hereinafter referred to as "whistling noise") in some cases.

The above-described air blowing device is configured such that, when the predetermined part crosses over the connection portion, the predetermined part moves approximately perpendicularly to the longitudinal direction of the connection portion. When the width of the connection portion as measured in the direction perpendicular to the longitudinal direction thereof (i.e., the above-mentioned "predetermined width W") is set to either a "width W1 corresponding to the position of the airflow direction adjustment plate at which the whistling noise is generated (i.e., the above-mentioned "predetermined range")" or a "width W2 equal to or larger than the width W1", the predetermined part of the airflow direction adjustment plate instantaneously crosses over the connection portion having the "width W", whereby the airflow direction adjustment plate instantaneously moves to the first position (the fully-closed state). Therefore, continuation of the generation of the whistling noise can be suppressed to a possible extent (that is, the predetermined member can be prevented from remaining at the position shown in FIG. 1(b) to a possible extent).

Additionally, it is possible to select only a specific range within the movable range of the airflow direction adjustment plate in which the whistling noise is generated. Then, it is possible to configure the air blowing device so that the airflow direction adjustment plate instantaneously moves over that specific range to reach the first position (the fully-closed state). Therefore, a range in which the airflow direction adjustment plate can be adjusted without generating the whistling noise can be maximized. In other words, by substantially conforming the above-described "predetermined width W" with the "width W1 corresponding to the position of the airflow direction adjustment plate at which the whistling noise is generated", the "range in which the angle of pivotal movement of the airflow direction adjustment plate can be stably maintained" within the range in which no whistling noise is generated (i.e., an effective airflow direction adjustable range) can be maximized.

Further, when the thickness of the connection portion as measured along a radial direction is "reduced to a possible extent within a range in which the strength of the connection portion is not impaired," the predetermined part can cross over the connection portion more easily, whereby continuation of the generation of the whistling noise can be suppressed further.

In the above-described air blowing device, it is preferable that the leg portion has a cross-sectional shape taken perpendicular to a longitudinal direction thereof (hereinafter may be simply referred to as the "cross section perpendicular to the longitudinal direction") of a circle or a square.

As described above, the "leg portion" of the operation load application member generates an axial elastic force directed in the axial direction of the tubular body, and a radial elastic force directed toward the radially outward direction of the tubular body. When the cross section perpendicular to the longitudinal direction of the leg portion has a circular or a square shape, the leg portion can generate a proper elastic force in both the above-described directions. Thus, there can be obtained an operation load application member which can induce the axial elastic force and the radial elastic force in a well balanced manner.

In the above-described air blowing device, it is preferable that the leg portion has two legs each extending from a leg-portion-side end of the connection portion, the two legs each has the first projection and the second projection at its tip, and an angle defined between the two legs and facing to the annular projection portion is equal to or larger than 90 degrees. It is more preferable that the angle is from 90 degrees to 180 degrees.

In the case where the operation load application member has two legs, the magnitude of the axial elastic force is also influenced by the magnitude of the angle defined between the two legs and facing to the annular projection portion. By setting this angle to 90 degrees or larger, the operation load application member can generate a more proper axial elastic force.

In the above-described air blowing device, it is preferable that the predetermined part of the at least one airflow direction adjustment plate has a spherical shape.

As described above, the predetermined part is locked to the connection portion of the operation load application member after being crossed over the connection portion. By configuring the predetermined part to have a spherical shape, when the airflow direction adjustment plate is pivotally moved toward the first position, the predetermined part can cross over the connection portion more easily. Thus, continuation of the generation of the above-described whistling noise is suppressed further.

BRIEF DESCRIPTION OF THE DRAWINGS

FIG. 4 is a set of side views of an operation load application member according to the embodiment of the present invention.

DETAILED DESCRIPTION OF THE INVENTION

An embodiment of an air blowing device of the present invention will next be described with reference to the drawings.

Figure 5:
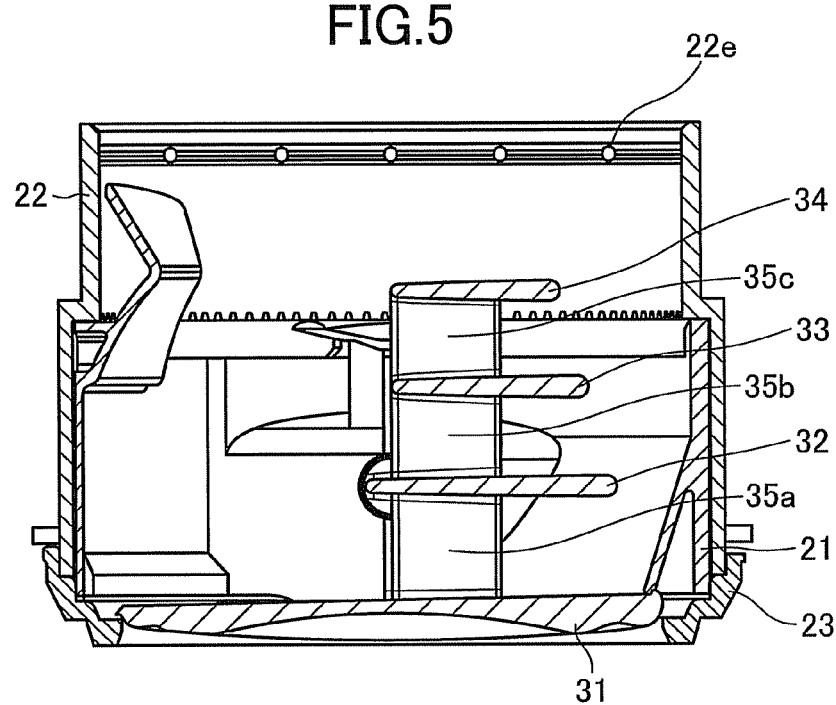
FIG. 5 is a sectional view of the air blowing device shown in FIG. 2 as cut by a plane along line 1-1 of FIG. 2.
Figure 6:
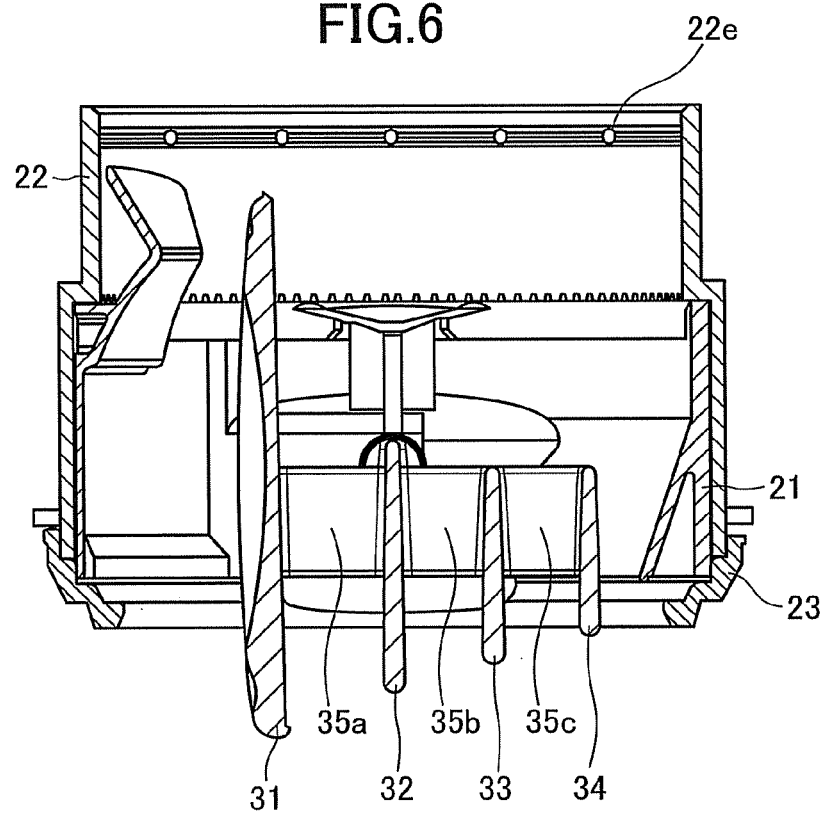
FIG. 6 is a sectional view of the air blowing device shown in FIG. 2 as cut by a plane along line 1-1 of FIG. 2.
Figure 7:
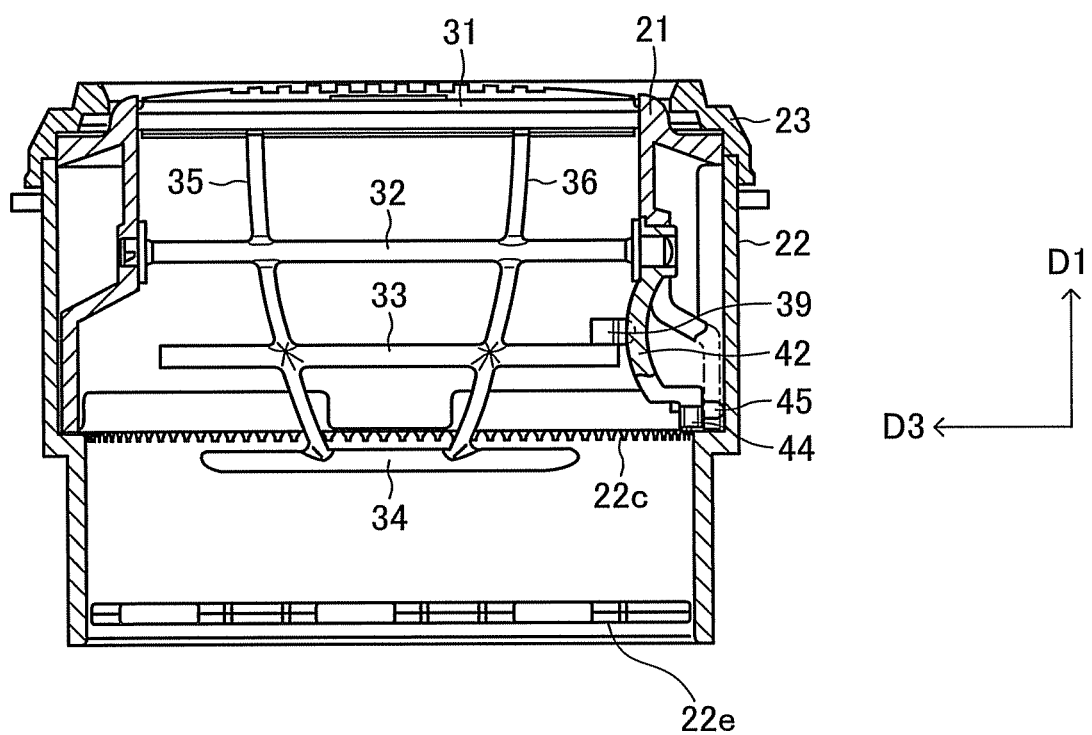
FIG. 7 is a sectional view of the air blowing device shown in FIG. 2 as cut by a plane along line 2-2 of FIG. 2.

As described above, FIG. 2 is a perspective view showing an embodiment of the air blowing device of the present invention; FIG. 3 is an exploded perspective view of the air blowing device shown in FIG. 2; FIG. 4 is a set of side views of an operation load application member according to the embodiment of the present invention; FIGS. 5 and 6 are sectional views of the air blowing device shown in FIG. 2 as cut by a plane along line 1-1 of FIG. 2; and FIG. 7 is a sectional view of the air blowing device shown in FIG. 2 as cut by a plane along line 2-2 of FIG. 2.

Figure 2:
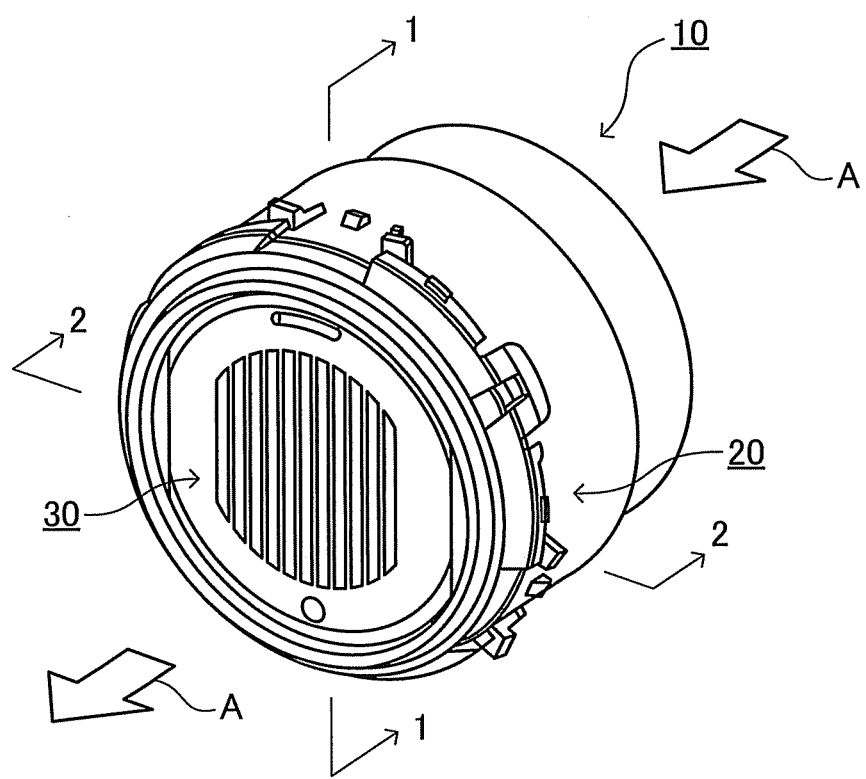
FIG. 2 is a perspective view showing an embodiment of the air blowing device of the present invention.
Figure 3:
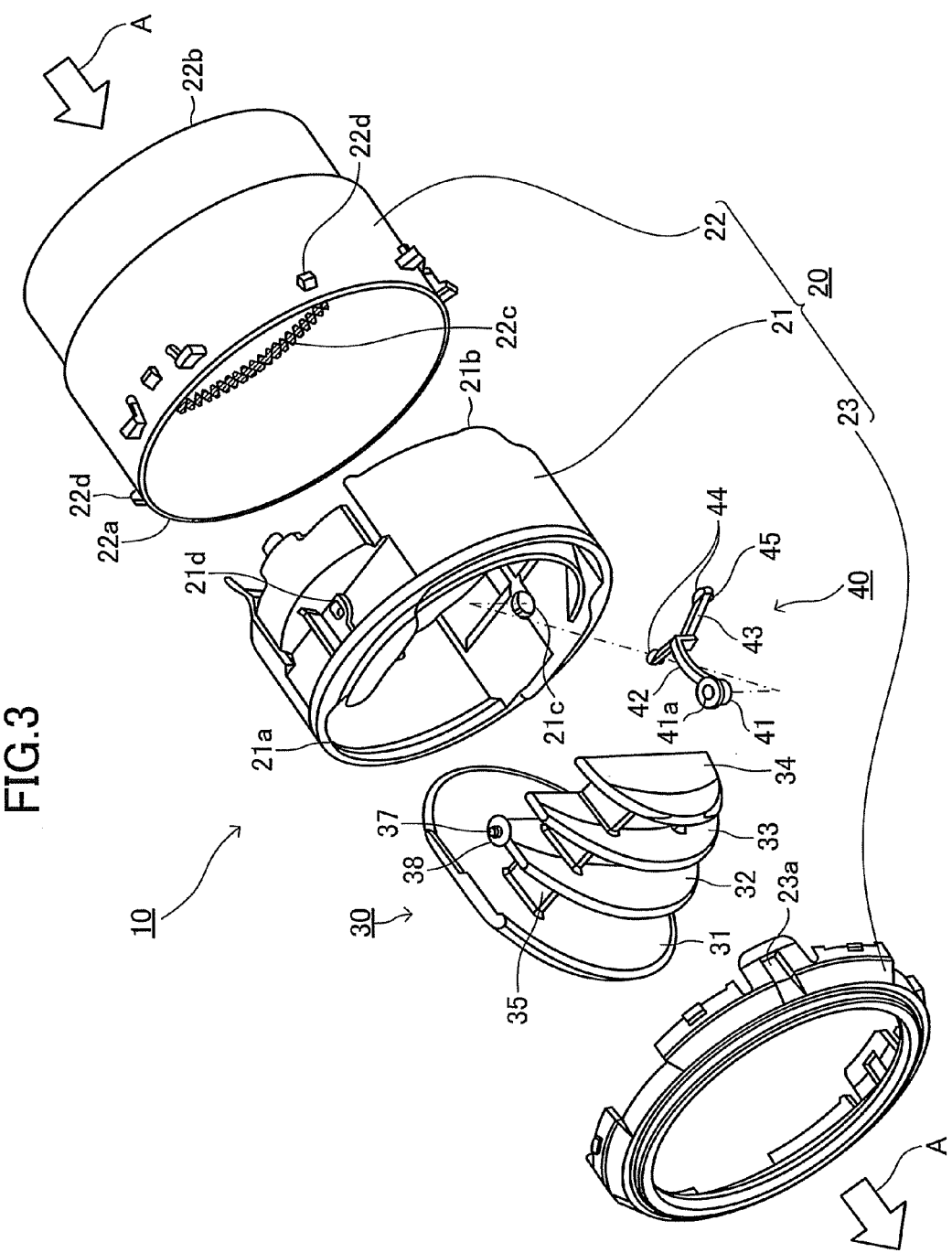
FIG. 3 is an exploded perspective view of the air blowing device shown in FIG. 2.

As shown in FIG. 2, an air blowing device 10 includes a tubular body 20 and an airflow adjustment member 30, which is supported in the interior of the tubular body 20. As shown in FIG. 3, the tubular body 20 is composed of an inner register 21 for supporting the airflow adjustment member 30; a cylindrical retainer 22, to which the inner register 21 is fitted; and an annular bezel 23, which is fitted to a front-end portion of the retainer 22. The inner register 21, the retainer 22, and the bezel 23 are coaxially disposed. As indicated by arrows A in FIGS. 2 and 3, air flows into the air blowing device 10 from the rear-end side of the tubular body 20 (rear-end portion of the retainer 22) and is blown out from the front-end side of the bezel 23. The structures of the members are described below.

The inner register 21 is a cylindrical body whose front-end portion 21a and rear-end portion 21b are open. The inner register 21 has a thin-walled portion and thick-walled portions (portions whose inner surfaces are raised). Two thick-walled portions are provided so as to face each other.

One of the thick-walled portions has a mounting groove 21c (mounting recess). The mounting groove 21c is formed along the axial direction of the inner register 21. An operation load application member 40 to be described later is attached to the mounting groove 21c. Meanwhile, the other thick-walled portion of the inner register 21 has a bearing hole 21d formed therein so as to face the mounting groove 21c.

The retainer 22 is a cylindrical body whose front-end portion 22a and rear-end portion 22b are open. That is, the retainer 22 has the front-end portion 22a which functions as an air outlet, and the rear-end portion 22b which functions as an air inlet. A portion (front-end portion 22a) of the retainer 22 which is located frontward of a substantially central portion of the retainer 22 with respect to the axial direction of the retainer 22 has an inside diameter slightly larger than that of a portion (rear-end portion 22b) of the retainer 22 which is located rearward of the substantially central portion of the retainer 22 with respect to the axial direction of the retainer 22. An annular stepped portion is formed on an inner circumferential portion of the retainer 22 in a connection region between the front-end portion and the rear-end portion of the retainer 22. The stepped portion has a plurality of projections which are arrayed continuously and repeatedly. The plurality of projections project in the axial direction of the retainer 22. Hereinafter, the stepped portion of the retainer 22 at which the plurality of projections are provided is referred to as the "annular projection portion 22c."

The retainer 22 has a plurality of latch pawls 22d formed on the outer surface of its front-end portion. Further, the retainer 22 has a honeycomb mesh portion 22e which covers an open portion of its rear-end portion (see FIGS. 5 to 7). The mesh portion 22e prevents entry of foreign matter into the air blowing device 10.

The bezel 23 is an annular member. The bezel 23 has a plurality of latch holes 23a formed on its outer surface. As will be described in detail later, the latch pawls 22d of the retainer 22 are fitted into the respective latch holes 23a. Through this engagement, the bezel 23 is latched (fixed) to the retainer 22.

The air blowing device 10 of the present embodiment includes four airflow direction adjustment plates; i.e., a closing airflow direction adjustment plate 31, a first rear airflow direction adjustment plate 32, a second airflow direction adjustment plate 33, and a third airflow direction adjustment plate 34. The four airflow direction adjustment plates are connected in parallel with one another by a first connection member 35 and a second connection member 36 (see FIG. 7). These members are formed of the same material (in the present embodiment, a synthetic resin) in a unitary (inseparable) condition. In the present embodiment, the unitarily formed member will be referred to as an "airflow adjustment member 30."

The closing airflow direction adjustment plate 31 has a substantially disk-like shape. Specifically, the shape of the closing airflow direction adjustment plate 31 as viewed from the front side is substantially the same as that of a front-end opening portion (front-end portion 21a) of the inner register 21. Thus, when the airflow adjustment member 30 is positioned at a first position (see FIG. 5), the closing airflow direction adjustment plate 31 closes the front-end open portion of the inner register 21 by itself. Further, each of the first rear airflow direction adjustment plate 32, the second rear airflow direction adjustment plate 33, and the third rear airflow direction adjustment plate 34 has substantially semi-disk-like shape.

The first rear airflow direction adjustment plate 32 has a pair of pivots 37, which resemble round shafts, are provided at its respective opposite end portions (respective opposite ends of its substantially rectilinear portion) located on its major-diameter side, and project radially outward. One of the pair of the pivots 37 is press-fitted into the "bearing hole 41a formed in a pivot support portion 41 of the operation load application member 40," and the other one of the pair of the pivots 37 is inserted into the bearing hole 21d. As will be described later, the pivot support portion 41 is inserted into and fixed to the mounting groove 21c. By virtue of this configuration, the airflow adjustment member 30 pivotally moves about the pivotal axis, which is a straight line connecting the pair of the pivots 37, in a range from a first position (the fully-closed state) shown in FIG. 5 to a second position (the opened state) shown in FIG. 6. In addition, an annular member is provided around each pivot 37 so as to form a circular sliding surface 38 perpendicular to the pivot 37. Further, the second rear airflow direction adjustment plate 33 has a lock portion 39 provided at one of end portions located on its major-diameter side (see FIG. 7). The tip of the lock portion 39 has a spherical shape. The lock portion 39 projects radially outward from the outer edge of the second rear airflow direction adjustment plate 33, which has a substantially semi-disk-like shape in a planar view.

Next, the shape, etc. of the operation load application member 40 will be described. The operation load application member 40 is a member which has a pivot support portion 41, a connection portion 42, and two leg portions 43 and in which the pivot support portion 41 and the leg portions 43 are connected together via the connection portion 42. These members are formed of the same material (in the present embodiment, a synthetic resin) in a unitary (inseparable) condition. As described above, the operation load application member 40 is mounted to the mounting groove 21c provided on the inner surface of the inner register 21. Further, the two leg portions 43 of the operation load application member 40 are configured such that a cross section of each leg portion 43 cut along a plane perpendicular to the longitudinal direction thereof has a substantially square shape. One of two angles defined between the two leg portions 43, which faces to the annular projection portion 22c, is about 160 degrees.

As described above, the pivot support portion 41 has the bearing hole 41a, and the pivot 37 of the airflow adjustment member 30 is press-fitted into the bearing hole 41a. The two leg portions 43 each has a first projection 44 and a second projection 45 on its tip. When the operation load application member 40 is attached to the inner register 21, the first projections 44 project toward a direction along the axial direction of the inner register 21. Meanwhile, in such a state, the second projections 45 project toward the radially outward direction of the inner register 21. Further, in such a state, the connection portion 42 curves such that it projects toward the radially inward direction of the inner register 21.

The above-mentioned members are assembled together as described below, thereby providing the air blowing device 10. A method of assembling the air blowing device 10 will next be described below.

First, the operation load application member 40 is fitted into the mounting groove 21c of the inner register 21 in such a manner that the longitudinal direction of the connection portion 42 thereof becomes parallel to the axis of the inner register 21. At that time, the operation load application member 40 is held by the inner register 21 such that the leg portions 43 project rearward beyond the rear-end portion 21b of the inner register 21. Then, one of the pair of the pivots 37 of the airflow adjustment member 30 is inserted into the bearing hole 21d of the inner register 21, whereas the other one of the pair of the pivots 37 is press-fitted into the bearing hole 41a provided in the pivot support portion 41 of the operation load application member 40 attached to the mounting groove 21c of the inner register 21. By this procedure, the airflow adjustment member 30 is pivotally mounted in the inner register 21. At that time, due to friction between the bearing hole 41a and the pivot 37 inserted into the bearing hole 41a, an operation load (pivotal operation load) is induced when the airflow adjustment member 30 is pivotally moved about the pivotal axis perpendicular to the axis of the air blowing device 10.

The airflow adjustment member 30 is mounted into the inner register 21 in the above-described manner. Subsequently, the inner register 21 in which the airflow adjustment member 30 is mounted is inserted into the retainer 22 through the opening portion 22a of the retainer 22. At this time, as shown in FIG. 7, the first projections 44 of the operation load application member 40 are brought into contact with the annular projection portion 22c of the retainer 22. Further, the second projections 45 of the operation load application member 40 are elastically pressed against the inner wall of the retainer 22. Then, the bezel 23 is attached to the opening portion 22a of the retainer 22. At this time, the latch pawls 22d of the retainer 22 are latched in the respective latch holes 23a of the bezel 23. As a result, the first projections 44 provided at the tips of the leg portions 43 of the operation load application member 40 are elastically pressed against the annular projection portion 22c of the retainer 22.

By means of assembling the members together as mentioned above, the air blowing device 10 is obtained.

In the thus-configured air blowing device 10, the leg portions 43 elastically deform in such manner that the leg portions 43 curve in a direction parallel to the axis of the retainer 22 and away from the annular projection portion 22c (i.e., in the direction D1 shown in FIGS. 4 and 7). Due to reaction forces induced as a result of elastic deformation of the leg portions 43, the first projections 44 are pressed against the annular projection portion 22c. Accordingly, when the inner register 21 is rotated about the axis of the retainer 22, the first projections 44 moves over projections of the annular projection portion 22c one after another while being in contact with the annular projection portion 22c. As a result, an operation load (rotational operation load) is induced when the airflow adjustment member 30 is rotated about the axis of the air blowing device 10, and an operation feel (rotational operation feel) at that time is provided.

Further, at that time, the second projections 45 of the operation load application member 40 are pressed against the inner wall of the retainer 22 toward the radially outward direction (a direction opposite the direction D3 of FIGS. 4 and 7). At that time, the leg portions 43 elastically deform in accordance with forces received by the second projections from the inner wall of the tubular body. Then, these leg portions elastically deform such that they curve toward the radially inward direction (the direction D3 shown in FIG. 2). Due to reaction forces induced as a result of elastic deformation of the leg portions, the second projections 45 are pressed against the inner wall of the retainer 22. Accordingly, when the inner register 21 is rotated about the axis of the retainer 22, the second projections 45 move on the inner wall of the tubular body while maintaining the state where the second projections 45 are in contact with the inner surface of the tubular body (the inner surface of the front-end-side portion of the retainer 22). As a result, the inner register 21 and the retainer 22 contact without inappropriate space therebetween. Thus, it is possible to suppress generation of noise (the hitting noise) due to hitting of the inner register 21 against the retainer 22, and prevent the rotation of the inner register 21 from being difficult or impossible (the rotation anomalous state).

Figure 1:
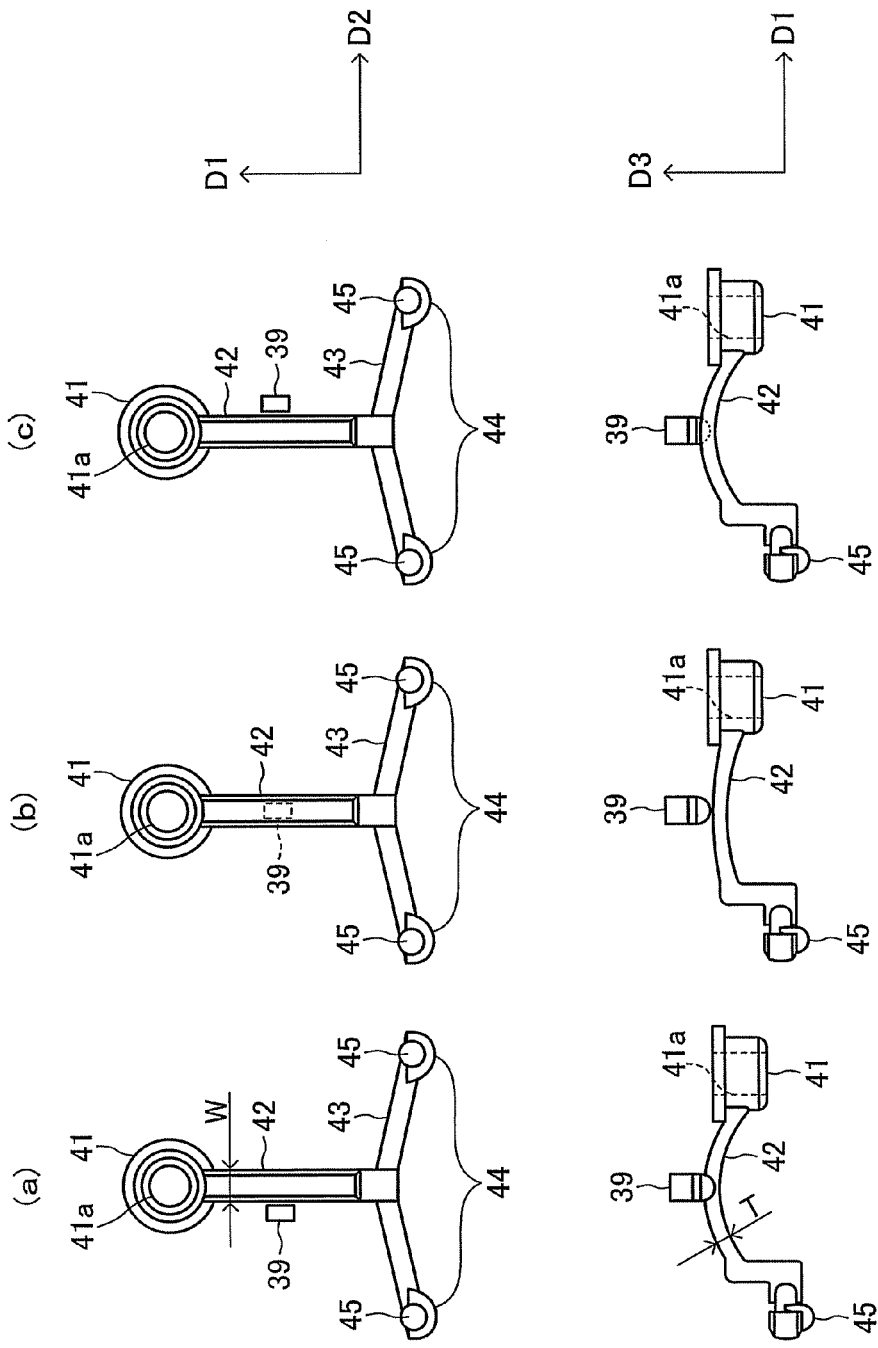
FIG. 1 is a set of schematic views showing a state in which a predetermined part of an airflow direction adjustment palate of an air blowing device of the present invention is locked to an operation load application member of the air blowing device.

When the airflow adjustment member 30 including the plurality of airflow direction adjustment plates rotates from the opened state shown in FIG. 6 to the fully-closed state shown in FIG. 5, the lock portion 39 of the airflow direction adjustment plates (in the present embodiment, a part of the second rear airflow direction adjustment plate 33) also moves with the rotation of the airflow direction adjustment plate. In the present embodiment, the lock portion 39 circularly moves about the pivots 37. However, when the airflow adjustment member 30 is in a state close to the fully-closed state (the first position), the lock potion 39 moves in a direction substantially perpendicular to the longitudinal direction of the connection portion 42. When the airflow adjustment member 30 is in the fully-closed state (the first position), as shown in FIG. 1(c) and FIG. 7, the lock portion 39 is locked to the connection portion 42 of the operation load application member 40. Thus, for the reason having been described with reference to FIG. 1, an operation feel (operation feel at the time of full closure) is provided when the airflow adjustment member 30 is pivotally moved toward the first position.

The air blowing device 10 configured as described above is attached to an air outlet of an air conditioner provided in the interior of an automobile or the like. When the airflow adjustment member 30 is brought into the fully-closed state (see FIG. 5), airflow to the interior of an automobile or the like can be shut off. Further, when an upper portion (in the vicinity of an elliptic recess in FIG. 2) of the closing airflow direction adjustment plate 31 in the fully-closed state is pressed toward the interior of the air blowing device 10, the airflow adjustment member 30 pivotally moves about the pivots 37. Continuation of the pivotal movement brings the airflow adjustment member 30 into the opened state (see FIG. 6). Further, the airflow adjustment member 30 can be fixed at any position in a range from the fully-closed state to the opened state (in actuality, within a pivotally movable range of the airflow direction adjustment plates 31 to 34 in which the above-described whistling noise is not generated; in a predetermined airflow direction adjustment state). Additionally, as mentioned above, the airflow adjustment member 30 can be rotated together with the inner register 21 about the axis of the inner register 21. Through this pivotal movement and this rotation, the blowing direction of airflow can be changed.

As described above, the air blowing device 10 according to the embodiment of the present invention includes:

a tubular body (the retainer 22; hereinafter simply described as "22") configured to form an air outflow channel, the tubular body 22 having a rear-end opening portion 22b allowing an air to flow into the tubular body 22 and a front-end open portion 22a allowing the air to blow out from the tubular body 22;

an annular member (the inner register 21; hereinafter simply described as "21") supported in the tubular body 22 so as to be coaxially rotatable with respect to the tubular body 22 about an axis of the tubular body 22;

at least one airflow direction adjustment plate (the airflow adjustment member 30; hereinafter simply described as "30") supported in the annular member 21, by a pair of pivot portions (the pivots 37; hereinafter simply described as "37"), so as to be un-rotatable with respect to the annular member 21 about an axis of the annular member 21 and be pivotally movable with respect to the annular member 21 about a common pivotal axis or each pivotal axis perpendicular to the axis of the annular member 21, the pair of pivot portions 37 projecting outwardly to be aligned with the common pivotal axis or the each pivotal axis, the at least one airflow direction adjustment plate 30 being configured to adjust a direction of the air blown out from the tubular body 22.

The air blowing device 10 includes an operation load application member 40 adjusting: a rotational operation load induced when the annular member 21 is rotated with respect to the tubular body 22; and a pivotal operation load induced when the at least one airflow direction adjustment plate 30 is pivotally moved with respect to the annular member 21.

In the air blowing device 10 of the present invention, the tubular body 22 including an annular projection portion 22c having a plurality of projections annularly arranged along inner surface of the tubular body 22.

The at least one airflow direction adjustment plate 30 is configured to pivotally move in an interlocking relation in a movable range from a first position (see FIG. 5) where the front-end opening portion 22a of the tubular body 22 is closed by one plate or a plurality of plates including the at least one airflow direction adjustment plate (in the present embodiment, the closing airflow direction adjustment plate 31 only) to a second position (see FIG. 6) where the front-end opening portion 22a of the tubular body 22 is not closed.

The operation load application member 40 includes: a pivot support portion 41; a leg portion 43; and a connection portion 42 connecting the pivot support portion 41 and the leg portion 43. The pivot support portion 41, the leg portion 43, and the connection portion 42 are integrally formed of same material in an inseparable manner (see FIG. 4).

The pivot support portion 41 has a bearing hole 41a. The pivot support portion 41 is engaged with an inner wall of the annular member 21. One of the pivot portions 37 aligned with the common pivotal axis or the each pivotal axis is press-fitted into the bearing hole 41a (see FIG. 7).

The leg portion 43 has, at its tip: a first projection 44 projecting toward a direction along the axial direction of the annular member 21 and engaging with the annular projection portion 22c; and a second projection 45 projecting toward a radially outward direction and pressing an inner wall of the tubular body 22 toward the radially outward direction (the direction opposite the direction D3 shown in FIG. 7) (see FIGS. 4 and 7).

The connection portion 42 curves to project toward a radially inward direction (the direction D3 shown in FIG. 7). A predetermined part 39 (the lock portion 39; hereinafter simply described as "39") of the at least one airflow direction adjustment plate 30 contacts with a radially inside surface of the connection portion 42 (see FIG. 1(b)) and presses the radially inside surface toward the radially outward direction (the direction opposite the direction D3 shown in FIG. 7) only when the at least one airflow direction adjustment plate 30 is positioned within a predetermined range (i.e., when the lock portion 39 is positioned at the position shown in FIG. 1(b)). The predetermined range is near the first position (see FIG. 5) in the movable range and does not include the first position. The predetermined part 39 is locked with the connection portion 42 when the at least one airflow direction adjustment plate 30 is positioned at the first position so as to maintain the at least one airflow direction adjustment plate 30 to be positioned at the first position (see FIGS. 1 and 7).

In the air blowing device 10, the operation load application member 40 can induce, by itself, all of the pivotal operation load, the rotational operation load and the rotational operation feel. Further, this operation load application member 40 can generate the operation feel at the time of full closure. Accordingly, it is unnecessary to individually manufacture a plurality of members which induce the loads and the feels respectively. Thus, the number of steps required for manufacturing the air blowing device can be reduced, and the production cost of the air blowing device can be lowered.

Moreover, the air blowing device 10 can be configured as follows: the connection portion 42 has a longitudinal direction extending along the axial direction of the annular member 21; The predetermined part 39 of the at least one airflow direction adjustment plate 30 moves with respect to the connection portion 42 in a direction approximately perpendicular to the longitudinal direction of the connection portion 42 when the at least one airflow direction adjustment plate 30 moves within the predetermined range; and the connection portion 42 has: a "predetermined width W" as measured in a direction perpendicular to the longitudinal direction; and a predetermined "thickness T" as measured along a radial direction. As described above, the predetermined width W substantially differs from the "width W1 corresponding to the position of the airflow direction adjustment plate at which a whistling noise is generated."

In the air blowing device 10, in general, when the predetermined part 39 starts to cross over the connection portion 42, the predetermined part 39 moves instantaneously without stopping until it crosses over the connection portion 42 and is locked to the connection portion 42. By setting the width of the connection portion 42 to the "width corresponding to the position of the airflow direction adjustment plate at which a whistling noise is generated," continuation of the generation of the whistling noise can be suppressed to a possible extent. More specifically, in the case where the airflow direction adjustment plate is pivotally moved toward the first position (the fully-closed state), the predetermined part 39 comes into contact with one side surface of the connection portion 42 when the airflow direction adjustment plate reaches the vicinity of the first position. At that time, the predetermined part 39 receives from the connection portion 42 a reaction force of a direction opposite the direction (moving direction) in which the predetermined part 39 is to move. When a force larger than the reaction force is applied to the predetermined part 39 in the moving direction, the predetermined part 39 moves onto the radially inside surface of the connection portion 42. In this state, the predetermined part 39 does not receive from the connection portion 42 any force (except for dynamic friction force) acting in a direction opposite the moving direction. Therefore, the predetermined part 39 crosses quickly (instantaneously) over the surface of the connection portion 42. Then, the airflow direction adjustment plate reaches the first position.

Moreover, the air blowing device 10 can be configured as follows: the leg portion 43 has a cross-sectional shape, taken perpendicular to a longitudinal direction thereof, of a circle or a square.

When the cross-sectional shape of the leg portion 43 is circular or square, the leg portion 43 can generate a proper elastic force in both the above-described directions (i.e., the axial direction and radial direction of the inner register 21). Thus, there can be obtained an operation load application member 40 which can induce the axial elastic force and the radial elastic force in a well balanced manner.

Moreover, the air blowing device 10 can be configured as follows: the leg portion 43 has two legs each extending from a leg-portion-side end of the connection portion 42. The two legs each have the first projection 44 and the second projection 45 at its tip. An angle defined between the two legs and facing to the annular projection portion 22c is equal to or larger than 90 degrees.

Through setting the above-mentioned angle to 90 degrees or larger, the operation load application member 40 can generate a more proper axial elastic force.

Moreover, the air blowing device 10 can be configured as follows: the predetermined part 39 of the at least one airflow direction adjustment plate 30 has a spherical shape.

By configuring the predetermined part 39 to have a spherical shape, when the airflow direction adjustment plate is pivotally moved toward the first position (the fully-closed state), the predetermined part 39 can cross over the connection portion 42 more easily. Thus, continuation of the generation of the above-described whistling noise can be suppressed further.

Moreover, in the air blowing device 10, the operation load application member 40, which has the above-described plurality of functions, is provided in the vicinity of the wall surface of the annular member (the inner register 21). Therefore, the effective cross-sectional area of flow channel for airflow flowing through the interior of the air blowing device 10 can be increased. As a result, a sufficient airflow rate can be secured.

While the present invention has been described in detail and with reference to specific embodiments thereof, it will be apparent to one skilled in the art that various changes and modifications can be made therein without departing from the spirit and scope thereof.

For example, in the above-described embodiment, the "airflow adjustment member 30 formed by integrally molding at least one airflow direction adjustment plate and a predetermined connection member in an inseparable condition" is employed. However, instead of the airflow adjustment plate 30, there may be employed an "airflow adjustment member which includes at least one independent airflow direction adjustment plates, and a connection member which connects these airflow direction adjustment plates so as to rotate them in an interlocking relation." Moreover, in the above-described embodiment, the predetermined part 39 is provided at an end portion of the second rear airflow direction adjustment plate 33. However, the predetermined part 39 may be provided at any position, so long as the predetermined part 39 can move when the airflow direction adjustment plates are pivotally moved. For example, the predetermined part 39 may be provided on an airflow direction adjustment plate other than the second rear airflow direction adjustment plate 33, or on a member which connects the airflow direction adjustment plates together.

The present application is based on Japanese Patent Application No. 2008-279754 filed on Oct. 30, 2008, and the contents of the application are incorporated herein by reference.

The invention claimed is:

1. An air blowing device comprising:
a tubular body configured to form an air outflow channel, the tubular body having a rear-end opening portion allowing an air to flow into the tubular body and a front-end open portion allowing the air to blow out from the tubular body;
an annular member supported in the tubular body so as to be coaxially rotatable with respect to the tubular body about an axis of the tubular body;
at least one airflow direction adjustment plate supported in the annular member, by a pair of pivot portions, so as to be un-rotatable with respect to the annular member about a longitudinal central axis of the annular member and be pivotally movable with respect to the annular member about one of a common pivotal axis and a predetermined pivotal axis perpendicular to the longitudinal central axis of the annular member, the pair of pivot portions projecting outwardly to be aligned with the one of the common pivotal axis and the predetermined pivotal axis, the at least one airflow direction adjustment plate being configured to adjust a direction of the air blown out from the tubular body; and
an operation load application member adjusting: a rotational operation load induced upon the annular member being rotated with respect to the tubular body; and a pivotal operation load induced upon the at least one airflow direction adjustment plate being pivotally moved with respect to the annular member, wherein:
the tubular body including an annular projection portion having a plurality of projections annularly arranged along inner surface of the tubular body,
the at least one airflow direction adjustment plate being configured to pivotally move in an interlocking relation in a movable range from a first position at which the front-end opening portion of the tubular body is closed by one plate or a plurality of plates including the at least one airflow direction adjustment plate to a second position at which the front-end opening portion of the tubular body is not closed,
the operation load application member including a pivot support portion, a leg portion, and a connection portion connecting the pivot support portion and the leg portion, the pivot support portion, the leg portion, and the connection portion being integrally formed of same material in an inseparable manner,
the pivot support portion having a bearing hole, the pivot support portion being engaged with an inner wall of the annular member, and one of the pivot portions aligned with the one of the common pivotal axis and the predetermined pivotal axis being press-fitted into the bearing hole,
the leg portion having at its tip, a first projection projecting toward a direction along the axial direction of the annular member and engaging with the annular projection portion, and a second projection projecting toward a radially outward direction and pressing an inner wall of the tubular body toward the radially outward direction, and
the connection portion curving to project toward a radially inward direction, and a predetermined part of the at least one airflow direction adjustment plate contacting with a radially inside surface of the connection portion and pressing the radially inside surface toward the radially outward direction only upon the at least one airflow direction adjustment plate being positioned within a predetermined range, the predetermined range being near the first position in the movable range and not including the first position, and the predetermined part being locked with the connection portion upon the at least one airflow direction adjustment plate being positioned at the first position so as to maintain the at least one airflow direction adjustment plate to be positioned at the first position.

2. The air blowing device according to claim 1, wherein the connection portion having a longitudinal direction extending along the axial direction of the annular member, the predetermined part of the at least one airflow direction adjustment plate moving with respect to the connection portion in a direction approximately perpendicular to the longitudinal direction upon the at least one airflow direction adjustment plate moving within the predetermined range, and the connection portion having a predetermined width as measured in a direction perpendicular to the longitudinal direction and a predetermined thickness as measured along a radial direction.

3. The air blowing device according to claim 1, wherein the leg portion having a cross-sectional shape, taken perpendicular to a longitudinal direction thereof, of a circle or a square.

4. The air blowing device according to claim 1, wherein the leg portion having two legs each extending from a leg-portion-side end of the connection portion, the two legs each having the first projection and the second projection at its tip, and an angle defined between the two legs and facing to the annular projection portion being equal to or larger than 90 degrees.

5. The air blowing device according to claim 1, wherein the predetermined part of the at least one airflow direction adjustment plate having a spherical shape.

\* \* \* \* \*